United States Patent [19]

Zaoralek

[11] Patent Number: 4,955,433
[45] Date of Patent: Sep. 11, 1990

[54] HEATING OR COOLING ROLLER

[75] Inventor: Heinz-Michael Zaoralek, Königsbronn, Fed. Rep. of Germany

[73] Assignee: Schwäbische Hüttenwerke GmbH, Aalen-Wasseralfingen, Fed. Rep. of Germany

[21] Appl. No.: 435,899

[22] Filed: Nov. 14, 1989

[30] Foreign Application Priority Data

Nov. 15, 1988 [DE] Fed. Rep. of Germany ....... 3838726

[51] Int. Cl.$^5$ ............................................... F28F 5/02
[52] U.S. Cl. ........................................ 165/89; 165/90; 29/116.1
[58] Field of Search ................... 165/89, 90; 29/116.1

[56] References Cited

U.S. PATENT DOCUMENTS 3,307,621  3/1967  Whisnant et al. .................... 165/89
3,794,118  2/1974  Bauch .................................. 165/90
4,459,726  7/1984  O'Brien et al. .................... 165/89
4,757,583  7/1988  Pav et al. ........................... 29/116.1

Primary Examiner—Albert W. Davis, Jr.
Attorney, Agent, or Firm—Armstrong, Nikaido, Marmelstein, Kubovcik & Murray

[57] ABSTRACT

A heating or cooling roller comprises a stationary axle, at least one hydrostatic or hydrodynamic bearing element to support a rotary roller shell on the stationary axle, and a heatable or coolable heat transfer medium which flows through an annular gap between the stationary axle and the rotary roller shell; the roller shell has peripheral axially parallel orifices for the heat transfer medium which is supplied and discharged through at least one radial channel in the stationary axle and via at least one annular space between the roller shell and the stationary axle.

7 Claims, 2 Drawing Sheets

HEATING OR COOLING ROLLER

BACKGROUND OF THE INVENTION

1. Field of the Invention

The invention relates to a heating or cooling roller comprising a stationary axle, at least one hydrostatic or hydrodynamic bearing element to support a rotary roller shell on the stationary axle, and a heatable or coolable heat transfer medium which flows through an annular gap between the stationary axle and the rotary roller shell.

2. Description of the Prior Art

Such rollers are used to produce and process webs of material, especially paper webs, and contribute greatly to the quality of the material webs to be produced or processed. Thus, among otherthings, it may be desirable to heat or cool the roller shell, hence directly affecting the material to be treated.

There are already heatable rollers with a rotary external roller shell and a stationary axle throughout the entire length.

Heating of the roller can take place internally, i.e. by means of a fluid heat transfer medium, especially thermal oil, which is fed into the gap between the axle and roller shell, or externally, i.e. especially by inductive heating.

The disadvantage of internally heated rollers is that the heat must flow through the roller shell from the inside to the outside; the shell thickness, however, is relatively great due to the required mechanical strength and therefore hinders heat flow. If relatively large amounts of heat are supplied to or removed from the roller body, a large temperature gradient from the inside to the outside is necessarily created.

To maintain a certain surface temperature, the temperature of the heat transfer medium must be raised or lowered accordingly.

The distortion of the roller body induced by the large temperature gradient causes, especially in the edge region of the roller, a deformation (the so-called "Oxbow Effect") so that only material webs of low quality can be produced there.

In the roller known from U.S. Pat. No. 4,459,726, the heat transfer medium is supplied and removed by a special sealing head and a special roller bearing with three track rings. This design is, however, extremely expensive and cannot be economically realised under practical conditions. Therefore these rollers have not been used to date.

SUMMARY OF THE INVENTION

Accordingly, the object of the invention is to avoid the afore-mentioned disadvantages of known rollers; in particular, a roller of the specified type is to be proposed which enables the feed and removal of the heat transfer medium through the stationary axle or core in a structurally simple and thus practical way.

According to he invention this is achieved in a heating or cooling roller comprising a stationary axle, at least one hydrostatic or hydrodynamic bearing element to support a rotary roller shell on the stationary axle, and a heatable or coolable heat transfer medium which flows through an annular gap between the stationary axle and the rotary roller shell by the improvement that the roller shell has peripheral axially parallel orifices for the heat transfer medium, and the heat transfer medium is supplied and removed through at least one radial channel in the stationary axle and via at least one annular space between the roller shell and the stationary axle.

Feasible embodiments are defined by the features of the subclaims.

In this case the heat transfer medium is supplied in such a way that it is routed through an orifice of the stationary axle or core and through one or more radial orifices into an annular space bordered to the outside by the roller shell or an extension attached to it and to the inside by the stationary axle. Seals, for example labyrinth seals, seal the annular space both towards the outside rolling bearing and also towards the inner annular gap with the bearing elements.

For these applications the seals need not satisfy especially strict lightness requirements. Relatively high leak rates can be tolerated. In some applications, certain specific leak rates are desirable to achieve certain effects.

The annular gap between the external shell and the stationary axle in which the bearing elements are located is partially filled with a hydraulic fluid, as is also used as a heat transfer medium. If the leak rate is set to roughly 20%, uniform heating of the roller shell and the axle would be ensured during start-up of the roller; this leads to minimized wear.

The ring-shaped intermediate space between the seals beyond the annular space, through which the heat transfer medium flows, could be flushed with the cooled heat transfer medium to protect in this way the outside rolling bearing from overheating.

Bores or channels route the heat transfer medium from the annular space, which is installed to supply the heat transfer medium, to the peripheral holes or bores in the roller shell.

By means of an identical annular space on the opposite end of the roller, the heat transfer medium can again be fed into a hole or bore of the stationary axle and discharged to the outside.

There is also a corresponding arrangement for the leakage liquid from the annular gap with the bearing elements.

The heat transfer medium is preferably routed through the entire axle in order to uniformly heat or cool the roller shell and axle during the temperature increase to or the temperature decrease from the operating temperature, respectively.

The peripheral holes can be connected on the ends such that the heat transfer medium can be transferred into the adjacent peripheral, axially parallel holes in each case. With an appropriate configuration, the annular space can be divided and provided with bores or channels which are alternately connected to adjacent peripheral holes. The heat transfer medium can also flow through three or more adjacent peripheral holes before it is returned to the axle. Multiple routing of the heat transfer medium through the roller shell makes it possible to pass smaller amounts of heat transfer medium through the roller per unit of time without decreasing the heat transfer from the heat transfer medium to the roller shell caused by lower flow velocities. A temperature drop in the axial direction is also avoided.

The afore-mentioned measures make it possible to reach the required surface temperatures with higher or lower temperatures of the heat transfer medium, depending on whether the roller is to be heated or cooled.

Since the heat now needs to take a shorter path from the peripheral holes to the roller surface, in the roller of the invention the temperature of the fluid heat transfer medium can be reduced with the surface temperature remaining the same. For example, to reach a surface temperature of the roller of 160° C., the heat transfer medium need only have a temperature of 192° C. In a conventional configuration the heat transfer medium would have to have a temperature of 224° C.

Among others, lowering the temperature of the heat transfer medium has the advantage that a heat transfer medium with lower thermal stability can be used and the temperature-dependant service life of the heat transfer medium can be significantly increased. In addition, when the temperature of the heat transfer medium remains uniform, a higher surface temperature can be reached. Therefore the achieved energy savings are considerable. At the same time, thermal stress and deformations ("Oxbow Effect"), which are greater the greater the temperature gradient, are reduced. In this way the material webs maintain the required quality even in the edge area of the roller. Finally, it is possible to use heat sources with lower initial temperatures (for example, steam) to heat up the heat tranfers medium.

BRIEF DESCRIPTION OF THE DRAWINGS

Suitable embodiments of the invention are detailed in the following with reference to the attached drawings.

DESCRIPTION OF THE PREFERRED EMBODIMENT

Figure 1:
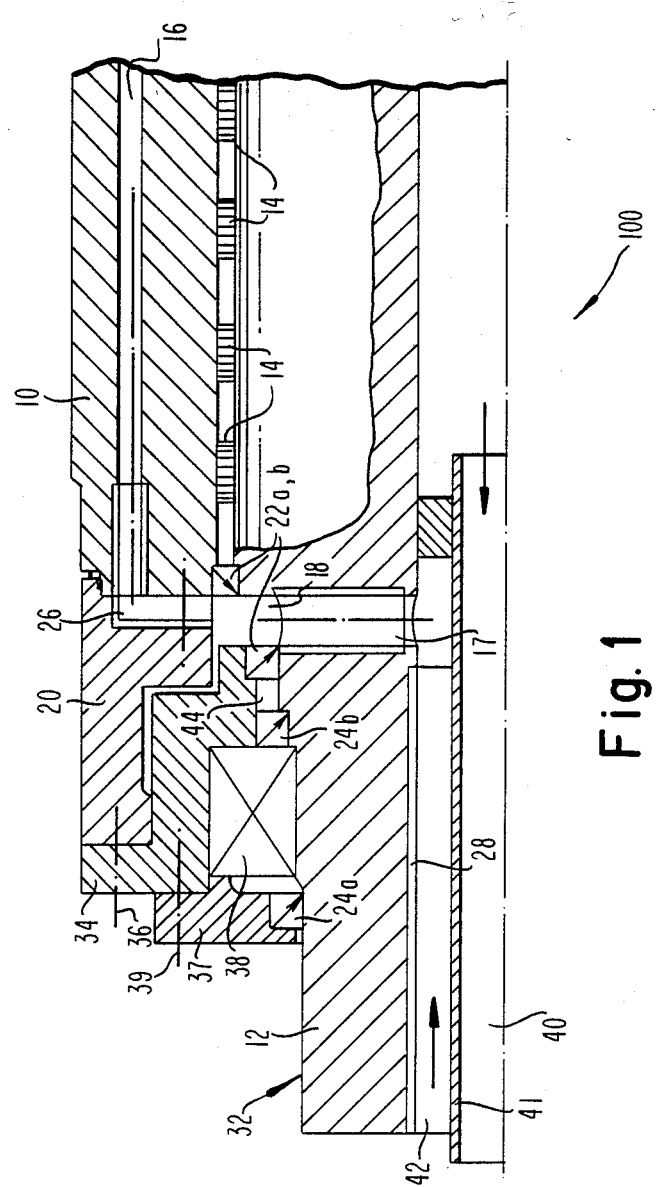
FIG. 1 shows a vertical section through one end of a first embodiment of an inventive roller.

The cooling or heating roller generally indicated by reference number 100 in FIG. 1 has a tubular roller shell 10 with a wall thickness such that it is mechanically stable in operation. A likewise tubular extension 20 is formed integrally with the roller shell 10; the outer diameter of the extension corresponds roughly to the outer diameter of the roller shell 10 and its inner diameter is much smaller than the inner diameter of the roller shell 10 so that a sleeve-shaped end region results.

The roller shell 10 is mounted on a stationary, hollow axle or core 12 by hydrostatic and/or hydrodynamic bearing elements 14 which are uniformly distributed over the length of the roller shell 10.

A bearing journal 34 is attached on one end to the end face of the extension 20 by screws 36. The bearing journal 34 therefore rotates with the roller shell 10 on the stationary axle 12; for this reason there is a ring bearing 38 between the end region of the axle 12 and the center part of the bearing journal 34.

A front flange 37 is attached to the exposed front of the bearing flange 34 by screws 39 and rests at its radially inner end on the axle. There is a seal 24a between the inner edge of the front flange 37 and the axle 12.

Several axially parallel bores 16 extend in the vicinity of the shell surface through the shell 10.

The stationary axle 12 has at least one radial channel 17 in the area of the two roller ends 32; this cannel opens into an annular space 18. On the feed/return side of a source from which the heat transfer medium is supplied to or removed from the roller shell 10, these annular spaces 18 are connected to the peripheral, axially parallel bores 16 via a supply line 42 in the axle 12 and the radial channels 26 in the shell 10.

On the side of the cooling or heating roller 100 facing away from the supply line 42 the axially parallel peripheral bores 16 are connected to an identically shaped cavity 18 which is connected in turn to a disposal line 40. The disposal line 40 removes the used heat transfer medium from the roller 100 again through the stationary axle 12. The two lines 40, 42 in the axle 12 are separated from each other by a pipe 41.

Each annular space 18 is confined at its radial outer end by the shell 10 or the extension 20, respectively, at its radial inner end by axle 12, at its axial inner end by a front face of the axle 12 and at its axial outer end by the bearing journal 34. Each annular space 18 also has seals 22a and 22b, especially labyrinth seals. Towards the roller ends other seals 24a and 24b ensure that the heat transfer medium or bearing oil cannot escape.

High demands need not be imposed on the seals 22b since some leakage can be tolerated. The annular gap with the bearing elements 14 is at least partially filled with a hydraulic liquid of a composition identical to that of the fluid heat transfer medium. A leakage of roughly 20% would even be advantageous for the uniform heating of the roller shell 14 and the axle 12 during start up of roller 100.

To prevent unnecessary thermal burdening of the rolling bearings 38 they are thermally separated from the remaining roller body by tubular thermal insulators 28 in the axle 12. As another measure, a coolant can be allowed to flow through the annular intermediate space 44 between seals 22a and 24b; said coolant consists of cooled heat transfer medium.

The mode of operation of the embodiment of FIG. 1 will be explained in the following.

During start up of roller 100 the heat transfer medium is fed into the peripheral, axially parallel bore 16 through the supply line 42 in the axle 12 via the channel 17, the annular space 18 and the channels 26. At the other end of the roller 10 the used heat transfer medium is again fed through the channels 26, a corresponding annular space 18 and the radial channel 17 into the disposal line 40 which extends through the axle 12. The used heat transfer medium leaves the roller 100 through the disposal line 40.

In the operation a specific leak rate which is determined by the seals 22b ensures that the annular space with the support elements 14 is also continuously supplied with the heat transfer medium. In this way the uniform heating or a uniform temperature of the entire roller 100 is ensured.

In this operation the temperature of the heat transfer mediu is adjusted such that the set operating temperature of he roller 100 is reached as quickly as possible and is then held at this set temperature. During the heat up of the roller the roller shell 10 can already be accelerated to the speed of rotation necessary for its later operation.

To protect the rolling bearings 38, coolant can flow through the annular spaces 44 during the entire operation to prohibit that they become too hot.

Figure 2:
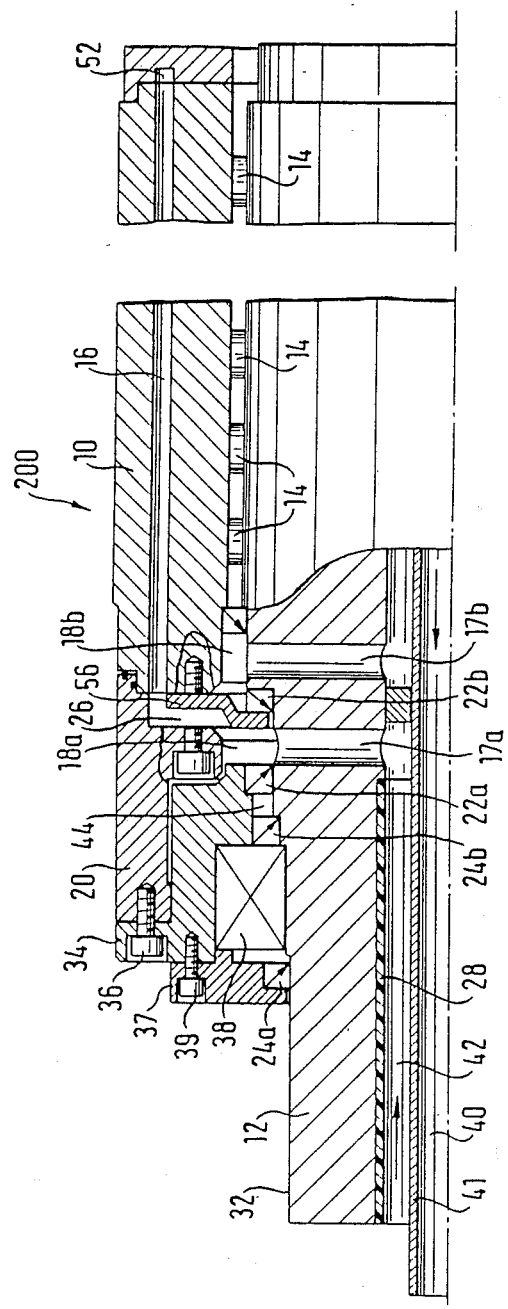
FIG. 2 shows a vertical section through one end of another embodiment of an inventive roller.

A second embodiment of a roller shown in FIG. 2 and generally indicated by reference number 200 corresponds essentially to the embodiment of FIG. 1.

The major difference between the two embodiments is that the peripheral bores 16 at the ends 52 are connected to each other in pairs such that the heat transfer medium flows actually through a heating or cooling loop. In this case the heat transfer medium is fed through a radial bore 17a and an annular space 18 and discharged from the external, rotary roller shell 10 through another annular space 18b and a radial bore 17b. The annular spaces 18a and 18b are formed by partitions of the annular space 18 shown in FIG. 1, using an insert 56.

It is also possible to interconnect more than two adjacent, axially parallel peripheral bores 16 to form a heating loop (not shown).

Multiple passage of the heat transfer medium through the axially parallel bores 16 in the shell 10 has the advantage that the volumetric flow of the heat transfer medium can be reduced without simultaneously reducing the heat transfer from the heat transfer medium to the roller shell 10 due to lower flow velocities, normally causing a temperature drop in the axial direction. When the heat transfer medium passes the roller three times, the volumetric flow, for example, can be greatly reduced; the heat transfer medium can be cooled during said passage by roughly 6° C., for example, without the risk of measuring a larger temperature difference in the axial direction of the roller surface.

If a corresponding volumetric flow were routed only once through the roller 100 or 200, this would lead to a corresponding temperature drop from one end of the roller to the other.

I claim:

1. A heating or cooling roller comprising a stationary axle, at least one hydrostatic or hydrodynamic bearing element to support a rotary roller shell on the stationary axle, and a heatable or coolable heat transfer medium which flows through an annular gap between the stationary axle and the rotary roller shell, wherein the roller shell has peripheral, axially parallel orifices for the heat transfer medium, and the heat transfer medium is supplied and removed through at least one radial channel in the stationary axle and via at least one annular space between the roller shell and the stationary axle.

2. A roller according to claim 1, wherein at least one peripheral, axially parallel orifice serving as an inlet is connected to another peripheral, axially parallel orifice serving as the return line so that a cooling or heating cycle with at least one loop is formed.

3. A roller according to claim 1, wherein the annular space is confined by seals between the shell and the axle.

4. A roller according to claim 3, wherein the seals have a defined, desired leak rate toward the annular gap.

5. A roller according to claim 1, wherein the heat transfer medium is routed back and forth at least once through the peripheral orifices which extend from one side to the other side of the roller before it is again returned to the stationary axle via one or more annular spaces.

6. A roller according to claim 1, wherein the discharged heat transfer medium flushes a central internal orifice of the axle.

7. A roller according to claim 1, wherein at the points at which heat transfer from the heat transfer medium to the roller, or vice versa, is not desired, especially in the area of the external rolling bearing, thermal insulators are disposed.

* * * * *